US007873093B2

(12) United States Patent  
van der Maas

(10) Patent No.: US 7,873,093 B2
(45) Date of Patent: Jan. 18, 2011

(54) METHOD AND APPARATUS FOR CARRYING OUT A LASER OPERATION AND USE OF A QUICK-CHANGE FILTER IN SUCH A LASER OPERATION

(75) Inventor: Marinus Frans van der Maas, Arnemuiden (NL)

(73) Assignee: Scientific Glass Technology Singapore Pte Ltd., Singapore (SG)

( * ) Notice: Subject to any disclaimer, the term of this patent is extended or adjusted under 35 U.S.C. 154(b) by 0 days.

(21) Appl. No.: 11/257,764

(22) Filed: Oct. 25, 2005

(65) Prior Publication Data

US 2006/0088073 A1 Apr. 27, 2006

(30) Foreign Application Priority Data

Oct. 25, 2004 (NL) .................................... 1027327

(51) Int. Cl.
*H01S 3/22* (2006.01)
*H01S 3/223* (2006.01)
*B01D 39/00* (2006.01)
*B01D 46/00* (2006.01)
*B01D 53/02* (2006.01)
*B01D 53/14* (2006.01)

(52) U.S. Cl. ............................ 372/59; 372/58; 96/106; 55/505

(58) Field of Classification Search ................. 96/241
See application file for complete search history.

(56) References Cited

U.S. PATENT DOCUMENTS 4,304,224 A * 12/1981 Fortney ........................ 55/314
4,316,157 A * 2/1982 Dosi et al. ..................... 372/59
4,345,623 A * 8/1982 Krull et al. ................ 137/637.2
4,611,327 A * 9/1986 Clark et al. .................... 372/58
5,478,378 A * 12/1995 van der Maas et al. ......... 55/505
5,645,720 A * 7/1997 Godines ...................... 210/282
5,858,040 A * 1/1999 Hansen ........................ 55/485
6,331,693 B1 12/2001 Smyth
6,829,034 B2 * 12/2004 Miwa et al. ................... 372/98
6,918,952 B2 7/2005 van der Maas
2002/0167986 A1 11/2002 Pan et al.
2004/0231517 A1 11/2004 van der Maas

FOREIGN PATENT DOCUMENTS

| DE | 44 41 199 | 5/1996 |
| DE | 198 42 413 | 10/1999 |
| EP | 0 606 960 | 7/1994 |
| JP | 63 299885 | 12/1988 |

* cited by examiner

*Primary Examiner*—Minsun Harvey
*Assistant Examiner*—Sean Hagan
(74) *Attorney, Agent, or Firm*—Weingarten, Schurgin, Gagnebin & Lebovici LLP

(57) ABSTRACT

A method and apparatus for carrying out a laser operation, wherein a laser source is provided, wherein lasing gas is supplied from at least one lasing gas source to the laser source for the formation of a laser beam, wherein, with the aid of the laser beam, an operation is carried out, such as for instance a welding, a drilling, a cutting or a lighting operation, wherein the lasing gas which comes from the at least one lasing gas source is fed through at least one lasing gas filter before the gas is supplied to the laser source. The invention further relates to the use of a quick-change filter for cleaning gases consumed in laser processing apparatuses.

22 Claims, 5 Drawing Sheets

METHOD AND APPARATUS FOR CARRYING OUT A LASER OPERATION AND USE OF A QUICK-CHANGE FILTER IN SUCH A LASER OPERATION

CROSS-REFERENCE TO RELATED APPLICATIONS

This application claims priority to a Dutch application No. NL 1027327 filed Oct. 25, 2004.

BACKGROUND OF THE INVENTION

The invention relates to a method for carrying out a laser operation, wherein a laser source is provided, wherein lasing gas is supplied from at least one lasing gas source to the laser source for the formation of a laser beam, wherein, with the aid of the laser beam, an operation is carried out, such as for instance a welding, a drilling, a cutting or a lighting operation.

The invention further relates to an apparatus for carrying out a laser operation, wherein the apparatus is provided with a laser source, which is connected to a lasing gas source via a lasing gas pipe system.

Lasers are used on a large scale for all kinds of operations. Possibilities are welding operations, drilling operations and cutting operations of metal, plastic, wood, paper and similar materials. However, lighting operations, for instance for lithographic processes, are often carried out with the aid of lasers as well.

A known problem of lasers is that the laser source requires regular maintenance in order to clean the optical system, which is present in the source. Inter alia moisture and hydrocarbons which are introduced into the source via the lasing gas cause pollution of the optical system in the source. Cleaning a laser source is very expensive, involving amounts of several thousands of euros. In order not to let the frequency of cleaning be too high, for various uses, often much stronger laser sources are bought than is strictly necessary for the process. The stronger laser sources can continue to function longer because the power produced by them remains sufficient for carrying out the operation for a longer period, even when the optical system in the source is polluted. It will be clear that laser sources with a higher power also have a higher cost price.

SUMMARY OF THE INVENTION

The invention contemplates providing a method and an apparatus whereby a solution for this problem is provided.

To this end, the method according to the invention is characterized in that the lasing gas which comes from the at least one lasing gas source is fed through at least one easing gas filter before the gas is supplied to the laser source.

The apparatus is characterized in that at least one lasing gas filter is included the lasing gas pipe system.

As a result of the presence of the lasing gas filter, the frequency with which the laser source needs to be cleaned can be reduced drastically. Instead of every six months, the cleaning may, for instance, take place every two years, which yields a saving of several thousands of euros a year. In addition, a laser source with a lower power can be used since the pollution occurring in the course of time need not be factored in. Consequently, the source can have the power needed for the operation to be carried out and not the higher power, as is often done now to compensate for pollution. A further advantage is that gases of a lower purity can be used, which has a considerable cost-reducing effect.

In many laser operations, the laser beam is guided to a laser processing head via an optical system. Also to such laser processing heads, processing gas is often supplied, for instance to screen a cutting area, welding area or drilling area from the atmosphere. The material surface of the material to be processed is thus prevented from oxidizing as a result of the operation when this is not intended or from obtaining an undesired, for instance too rough, surface structure. In practice, it is found that still, despite the use of processing gas, undesired oxidation of the material to be processed occurs. Conversely, with laser cutting operations based on oxidation, an excess of oxygen is desired in the cutting operation and the presence of other gases can result in an undesired surface structure of the material.

According to a further elaboration of the method according to the invention, it is particularly favorable when the processing gas is fed through at least one processing gas filter before it is supplied to the processing head. To this end, according to a further elaboration, the apparatus is characterized in that at least one processing gas filter is included in the processing gas pipe system connecting the laser processing head with the processing gas source.

It is thus effected that the processing gas has a higher purity, which generally results in a better surface quality of the processed material. Undesired oxidation of the processed material is reduced as well when oxygen has been removed from the processing gas by the filter. Further, as a result of a better surface tension and viscosity, the quality of the melting bath will improve when the processing gas does not contain any pollutions. With oxidation-based processing techniques, the efficiency increases when the processing gas is pure oxygen instead of oxygen with pollutions.

According to a further elaboration of the invention, the method is characterized in that the lasing gas contains at least He, $N_2$ and/or $CO_2$. It is noted that other gases are also possible when lasers of a different color are used.

According to a further elaboration, the processing gas may comprise, for instance, $O_2$, $N_2$, air, He, Ar and/or $H_2$.

Since the operators of the apparatuses for carrying out a laser operation have had a different type of training than laboratory personnel, it would be particularly favorable if the placement and removal of the filters could be done in a relatively simple manner.

To this end, the method for a further elaboration is characterized in that the empty gas filter is a quick-change filter which can manually be fastened on a base. Such quick-change filters are, for instance, described in EP-A-0 606 960, a European patent application 04076518.2 which is published as EP 1 479 428 A2, and are also put into circulation by Varian® Inc. under the designation Gas Clean Filter and are to date used for cleaning carrier gases for the purpose of detection processes such as gas chromatography and mass spectrometry.

It will be clear that it is likewise advantageous for the processing gas filter when a quick-change filter is used for it which can manually be fastened on a base.

Such quick-change filters can only be mounted on the base in one manner and are fastened by a fastening ring to be loosened and tightened manually. Consequently, the apparatus operator can simply change such filters by himself.

Preferably, the method according to a further elaboration is characterized in that, when the quick-change filter is charged, the quick-change filter is removed from the base, while, by the removal of the quick-change filter from the base, a gas supply and a gas discharge in the base to the quick-change filter are closed off automatically and a bypass pipe in the base is opened automatically, in such a manner that an uninterrupted gas supply to the laser source and/or the processing head takes place, while, by placing a new gas filter on the base, the bypass pipe is automatically closed off, the gas supply and gas discharge to the quick-change filter are automatically opened and the gas is fed through the filter.

It is true that the laser source is then temporarily fed with polluted gas, but the extent of pollution which occurs is very small, since this only takes a very short period. In any case, it is thus effected that the laser operation can simply continue, which is in many cases very important.

According to a further elaboration of the method according to the invention, the lasing gas can be led through a moisture filter, an oxygen filter and/or a hydrocarbon filter. Optionally, a combination of these filters can be included in one single filter housing. Here, it is preferred when the at least one filter is provided with an indicator which indicates whether and optionally to what degree the filter material is saturated, while the filter is replaced by a new filter when the indicator indicates a particular degree of saturation.

It is thus effected that the users replace the filters in time, so that it is guaranteed that, always, pure gas is led to the laser source and/or the laser processing head.

The invention further relates to the use of a quick-change filter for cleaning lasing gas which is led to a laser source of a laser processing apparatus, while, by a simple operation, the quick-change filter is placeable on and removable from abase which is included in a lasing gas pipe system connecting a lasing gas source with the laser source.

The invention further relates to the use of a quick-change filter for cleaning a processing gas which is led to a laser processing head of a laser processing apparatus, while, by a simple operation, the quick-change filter is placeable on an removable from a base which is included in a processing gas pipe system connecting a processing gas source with the laser source.

Above-mentioned uses result in the advantages described in connection with the method and the apparatus.

BRIEF DESCRIPTION OF THE DRAWINGS

The invention will now be explained in more detail on the basis of an exemplary embodiment, with reference to the drawing, in which.

DETAILED DESCRIPTION OF THE INVENTION

Figure 1:
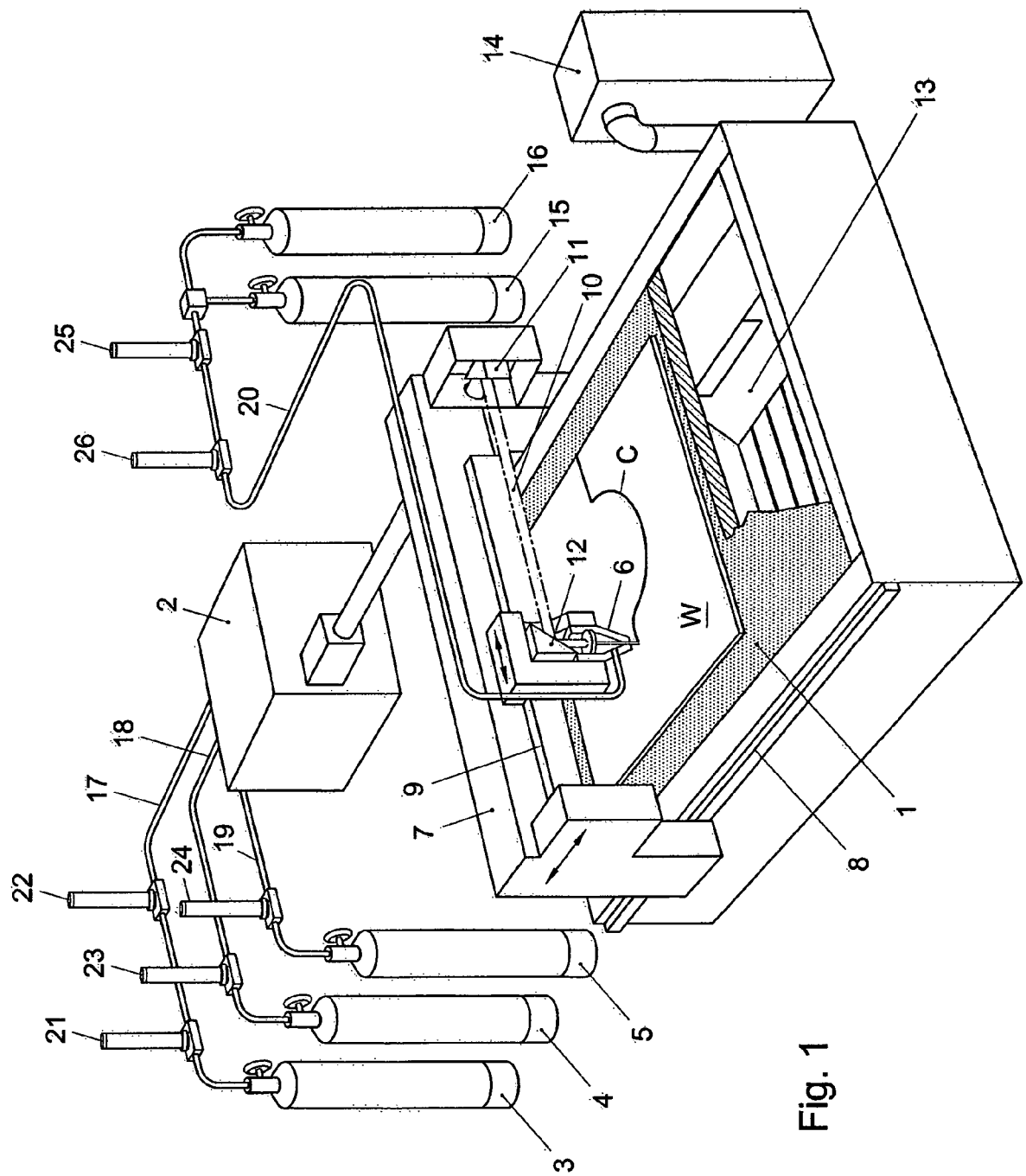
FIG. 1 shows an example of a laser processing apparatus, more in particular a laser cutting apparatus.
Figure 2:
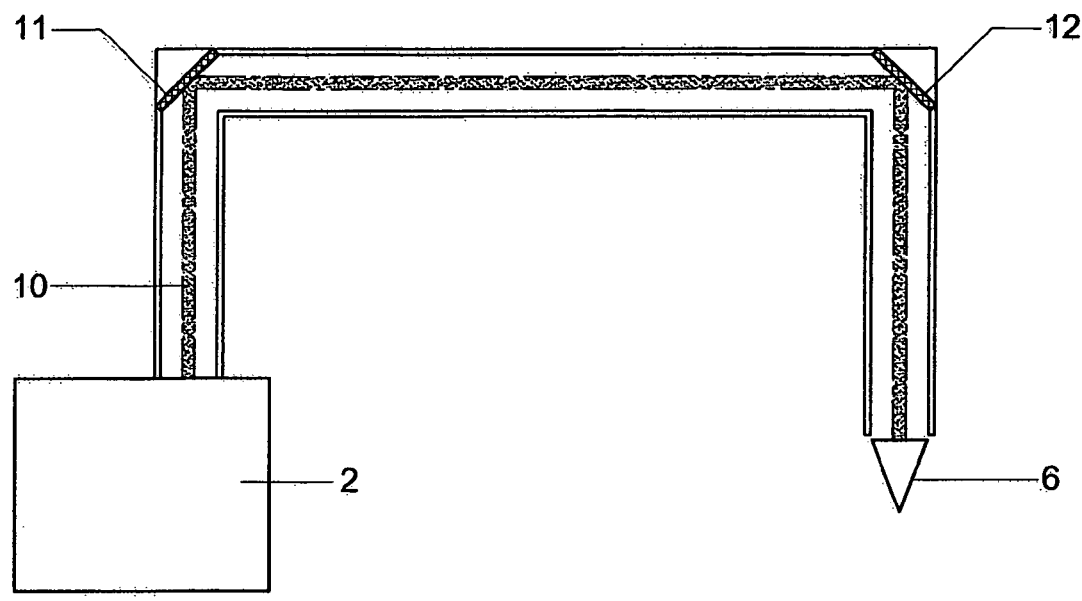
FIG. 2 schematically shows the optical system.

By way of example, FIG. 1 shows a laser cutting apparatus provided with a cutting table 1, a laser source 2, three lasing gas sources 3, 4 and 5, a laser processing head 6, which is connected with a portal 7. The portal 7 is movable along a guide 8 with respect to the table 1. The processing head 6 is movable along the portal 7 via guide 9. The laser beam 10, which comes from the laser source 2, is guided to the processing head 6 with two mirrors 11, 12. All this is schematically shown in FIG. 2. In the workpiece W, any contour C can be cut with the aid of the laser processing head 6. Under the table 1, there is an exhaust chamber 13 which is connected to an exhaust 14. FIG. 1 further shows two processing gas sources 15, 16. From the lasing gas sources 3, 4, 5, lasing gas pipe systems 17, 18, 19 extend which are in fluid connection with the laser source 2. From the processing gas sources, a processing gas pipe system 20 extends to the laser processing head 6. In the present exemplary embodiment, in each lasing gas pipe system 17, 18, 19, a filter in the form of quick-change filter 21, 22, 23, 24 is included. In the processing gas pipe system 20, two quick-change filters 25, 26 are included; this incidentally also holds true for the lasing gas pipe system designated by the reference numeral 17. It will be clear that, also in the other lasing gas pipe systems 18, 19, more than one filter can be included, for instance a filter for moisture, a filter for hydrocarbons and a filter for oxygen. Also, one single filter may be included in each lasing gas pipe system, which filter is arranged for removing different undesired substances from the lasing gas. In the processing gas pipe system 20, two filters are shown. It will be clear that, here, likewise more than two filters or one filter can be used, while the final result of the filter operation of course needs to be that the gas led to the laser processing head 6 has the desired purity. In the present exemplary embodiment, the lasing gas source 3 contains He, the lasing gas source 4 contains $N_2$ and the lasing gas source 5 contains $CO_2$. The processing gas source 15 contains $O_2$ and the processing gas source 16 contains $N_2$ in the present exemplary embodiment. Of course, other gases are also possible depending on the type of operation to be carried out and the type of laser source 2 which is used.

Figure 3:
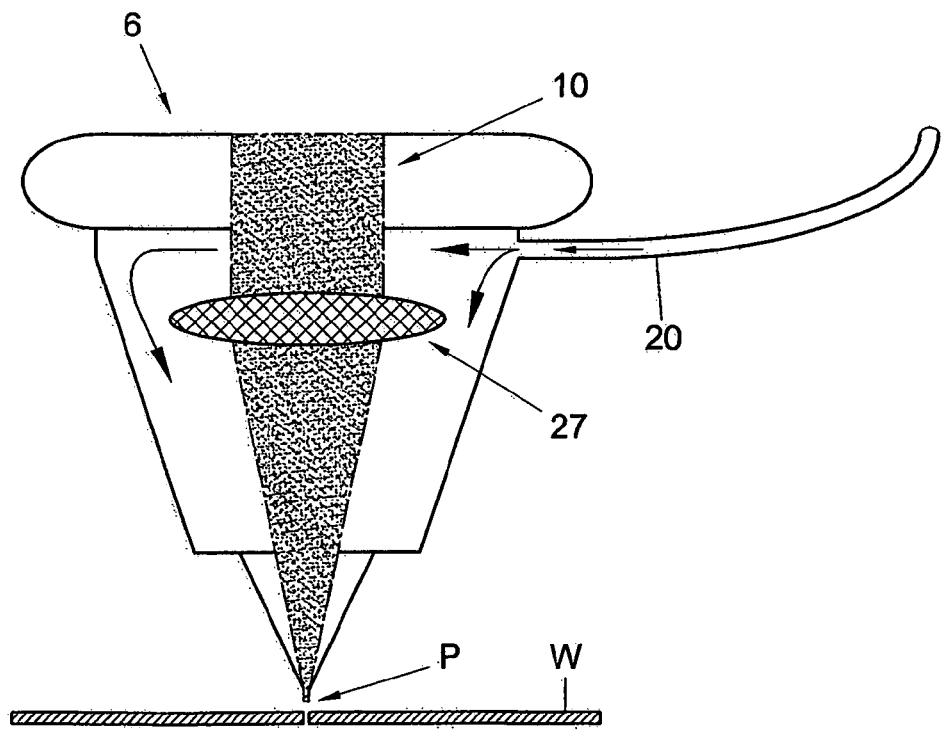
FIG. 3 shows a schematic cross-sectional view of a laser processing head.

FIG. 3 schematically shows a laser processing head 6 for carrying out a cutting operation. Processing heads for welding and processing heads for drilling have a similar construction. Clearly visible is the laser beam 10 which is focused with the aid of a lens 27, such that the focus is aimed at the workpiece W. Via processing gas pipe system 20, processing gas is led into the laser processing head 6 and fed to the processing point P, with the purpose of screening the processing point P, so that oxygen and other components of the ambient air have no access to the processing point P during the operation. Thus, a very good surface quality of the processed zone is obtained, particularly because the processing gas has a very high purity as a result of the filter operation it has been subjected to. In a cutting operation not based on oxidation, the workpiece material is prevented from oxidizing. In a cutting method based on oxidation, pure oxygen is supply to the processing point, which results in a greater efficiency during cutting.

Figure 4:
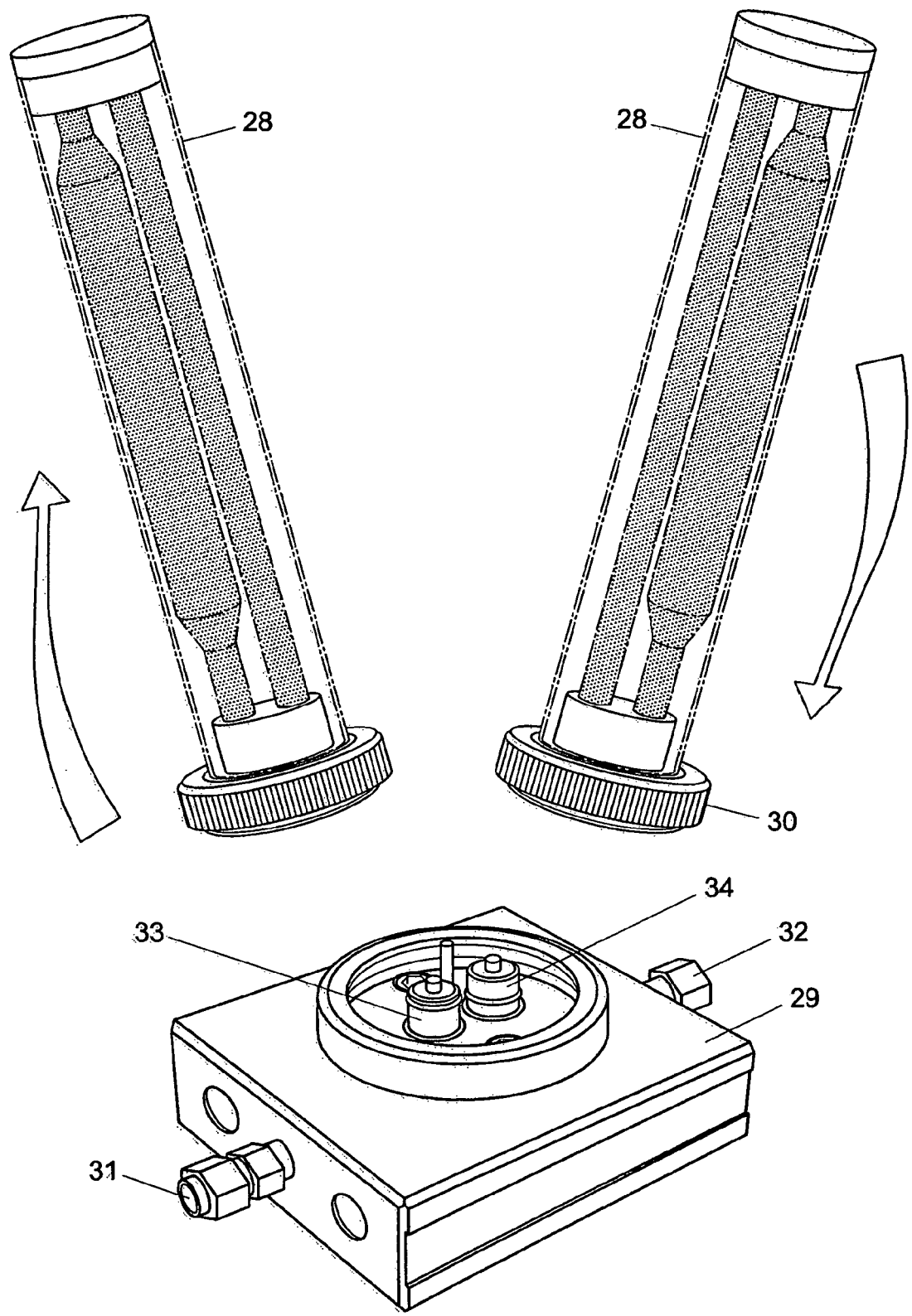
FIG. 4 shows a base and two associated quick-change filters.

FIG. 4 shows an example of a quick-change filter 28 and a base 29 on which the quick-change filter can be placed with the aid of a fastening ring 30 to be tightened manually. Such a quick-change filter is described in the above-mentioned European patent publications, whose contents are considered to be incorporated herein by reference. The base contains an inlet 31 and an outlet 32, which are connected by the lasing gas pipe system 17, 18, 19 and/or the processing gas system 20. The base further comprises a gas supply 33 leading to the quick-change filter 28 and a gas discharge 34 through which the gas coming from the quick-change filter 28 is discharged again to the outlet 32 of the base 29. The gas supply 33 and the gas discharge 34 are preferably provided with stop valves which are automatically opened upon placement of the filter 28 on the base. Upon removal of the filter 28 from the base 29, the valves will close automatically. Optionally, in the base, a bypass pipe may be provided which is closed off when the filter is placed on the base 29 and which is opened when the filter is removed from the base 29. Thus, an uninterrupted feed-through of gas to the laser source and the laser processing head 6, respectively, is guaranteed.

Figure 5:
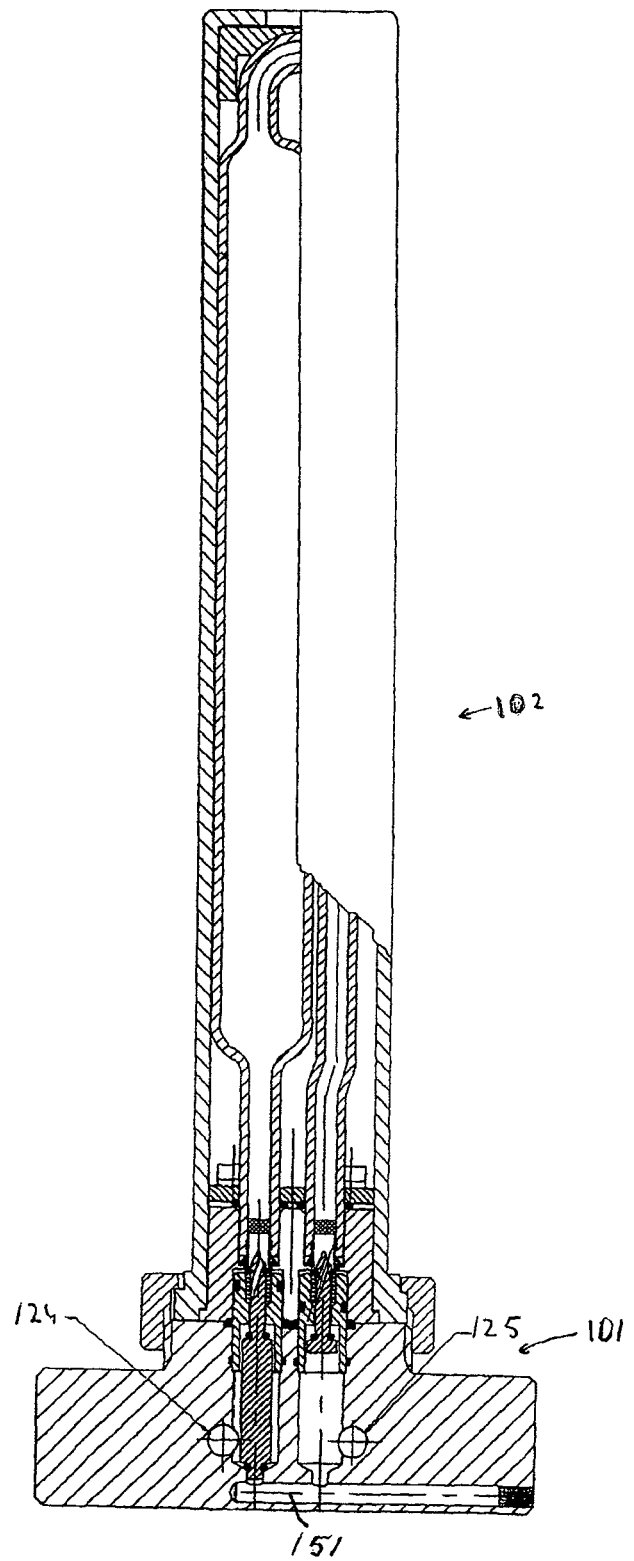
FIG. 5 shows a cross-sectional view of an embodiment of a base with a filter placed thereon.
Figure 6:
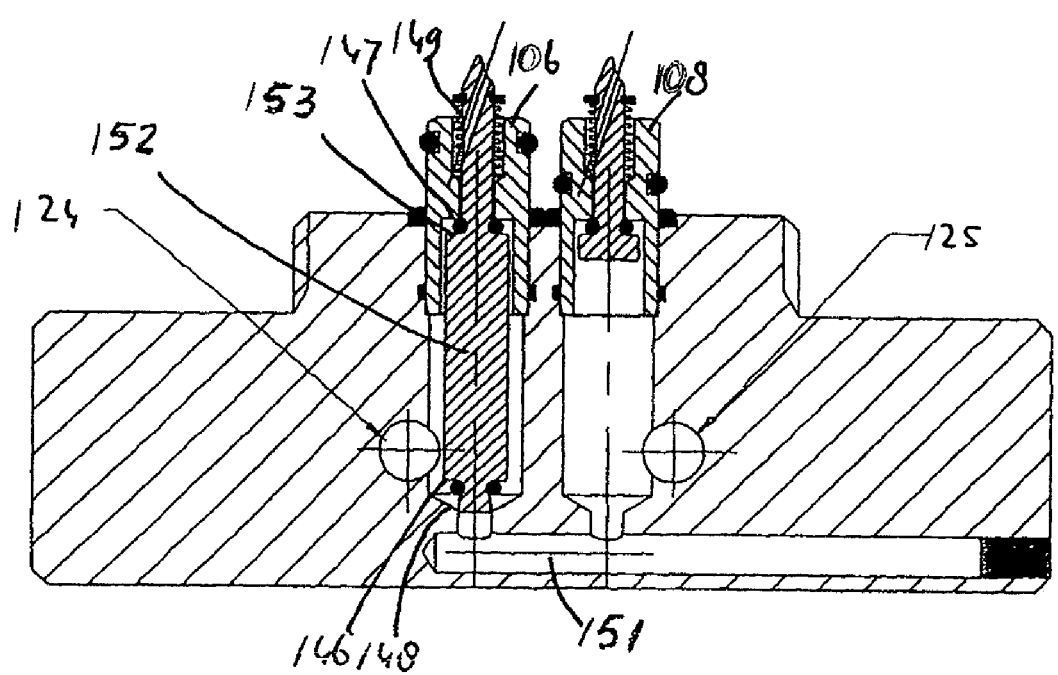
FIG. 6 shows the base of FIG. 5 without a filter placed thereon.

FIG. 5 shows a cross-sectional view of an embodiment of a base 101 with a filter 201 placed thereon. FIG. 6 shows the base 101 without a filter 201 placed thereon. The base 101 is provided with a by-pass pipe 151 and with means for creating a fluid connection between the inlet connecting element 103 and the outlet connecting element 104 via the by-pass pipe 151 when a quick-change filter 102 is decoupled from the base 101 and for closing off this fluid connection when a quick-change filter 102 is placed on the base 101. In the present exemplary embodiment, the means are formed by incorporating in the gas inlet stub 106 a pin 152 which is longitudinally adjustable in relation to the base 101, which pin is provided with a first and second sealing face 153, 146. The base 101, more in particular the gas inlet stub 106 thereof, contains a first and second valve seat 147, 148. In a first position, the pin 152 lies with the first sealing face 153 against the first valve seat 147 and thus forms a block in a fluid connection between the gas inlet stub 106 and the inlet connecting element 103 while a fluid connection is present between the inlet connecting element 103 and the by-pass pipe 151 (see FIG. 6). In a second position, the pin lies with the second sealing face 146 against the second valve seat 148 and thus forms a block in a fluid connection between the by-pass pipe 151 and the inlet connecting element 103 while a fluid connection is present between gas inlet stub 106 and the inlet connecting element 103 (see FIG. 5). The pin 152 is pressed into the position shown in FIG. 6 by a spring 149. Due to the presence of the by-pass pipe 151, the pipe system as well as the base 101 remain filled with carrier gas and thus the underlying process, such as for example gas chromatography, mass spectrography or LCMS can continue. Admittedly, unfiltered gas is briefly used, but this generally presents no problem to the underlying process. In any case, the duration of the flushing after changing the filter can be considerably reduced or omitted completely.

Since the gases in the gas sources sometimes also contain solid particles, it is further advantageous when at least one particle filter is disposed in the lasing gas pipe system and/or the processing gas pipe system. Preferably, such a particle filter is located downstream of the filter or the filters for moisture, oxygen and hydrocarbons because such filters can also still release particles. Here, it is further preferred that the particle filters are quickly changeable. To this end, the particle gas filters can be designed as quick-change filters, preferably in the form of a cartridge which is regenerable or disposable. The particle filters may, for instance, remove particles larger than 3 microns from the gas. The particle filter may be designed as a housing with sintered stainless steel or bronze balls therein. Optionally, the particle filter may be placed on a base which is provided with a bypass pipe which is opened automatically when the particle filter is removed from the base and which is closed automatically when the particle filter is placed on the base. A particle filter in the lasing gas pipe system prevents a fast pollution of the optical system via which the laser beam is guided to the processing head. A particle filter in the processing gas pipe system prevents particles from adversely affecting the correct or optimal performance of the operation.

It will be clear that the invention is not limited to the exemplary embodiment described, but that various modifications are possible within the framework of the invention as defined by the claims.

Thus, instead of the laser cutting apparatus, a laser welding apparatus, a laser drilling apparatus or a lighting apparatus may be provided with filters as indicated, in order to improve the efficiency of the apparatus and to considerably reduce the necessity of cleaning the laser source regularly. Further, other gases may be used than those mentioned in the present exemplary embodiment. Although, for reasons concerning operation, it is by far preferable to use quick-change filters, use of so-called inline filters could also be considered. Particularly inline filters which can be changed simply and quickly, for instance such as described in the not prior published international patent application PCT/NL2004/000564, whose contents are considered to be inserted herein by reference, are suitable for this.

The invention claimed is:

1. A method for carrying out a laser operation, wherein a laser source is provided, wherein lasing gas is supplied from at least one lasing gas source to the laser source for the formation of a laser beam, wherein, with the aid of the laser beam, an operation is carried out, such as for instance a welding, a drilling, a cutting or a lighting operation, characterized in that the lasing gas which comes from the at least one lasing gas source is fed through at least one lasing gas filter before the gas is supplied to the laser source, the lasing gas filter comprising a quick-change filter which can manually be fastened on a base, and wherein, for the purpose of changing the quick-change filter, the quick-change filter is removed from the base, wherein, by the removal of the quick-change filter from the base, a gas supply port and a gas discharge port in the base for connecting to the quick-change filter are closed off automatically and a bypass pipe containing no filtration element is automatically opened in the base, in such a manner that an uninterrupted gas supply to the laser source takes place, the closing off of the gas supply port and the gas discharge port and the opening of the bypass pipe being effected mechanically and passively by the removal of the quick-change filter from the base, and wherein, by placement of a new gas filter on the base, the bypass pipe is closed off automatically, the gas supply port and gas discharge port are opened automatically and the gas is fed through the filter, the opening of the gas supply port and the gas discharge port and the closing of the bypass pipe being effected mechanically and passively by the placement of the new filter on the base, the base comprising a first and second valve seat and a moveable element that is moveable between a first and a second position within the base and is provided with first and second sealing elements, wherein when the quick-change filter is removed from the base, the moveable element is biased to move to the first position such that the first sealing element is pressed against the first valve seat to form a block in a fluid connection between the lasing gas source and the gas supply port in the base while a fluid connection is opened between the lasing gas source and the by-pass pipe, and wherein the placement of a quick-change filter onto the base forces the moveable element to move to the second position so that the second sealing element is pressed against the second valve seat to form a block in a fluid connection between lasing gas source and the by-pass pipe while a fluid connection is opened between the lasing gas source and the gas supply port in the base, wherein the first and second sealing elements do not form sealing contact with the base over at least a portion of the range of motion of the moveable element as the moveable element moves between the first position and the second position.

2. A method according to claim 1, wherein the laser beam is guided to a laser processing head via an optical system, wherein processing gas is supplied to the laser processing head, wherein the processing gas is fed through at least one processing gas filter before it is supplied to the laser processing head.

3. A method according to claim 1 or 2, wherein the lasing gas contains at least He, $N_2$ and/or $CO_2$.

4. A method according to claim 2, wherein the processing gas comprises $O_2$, $N_2$, air, He, Ar and/or $H_2$.

5. A method according to claim 2, wherein the processing gas filter is a quick-change filter which can manually be fastened on a base.

6. A method according to claim 1 or 2, wherein the gas is led through a moisture filter, an oxygen filter, a hydrocarbon filter and/or a particle filter.

7. A method according to claim 6, wherein a series of at least two of the said filter types is included in the pipe system, among which the particle filter, wherein, of the series of filters, the particle filter is the filter included in the pipe system most downstream.

8. A method according to claim 1 or 2, wherein the at least one filter is provided with an indicator which indicates whether and optionally to what degree the filter material in the filter is saturated, wherein the filter is replaced by a new filter when the indicator indicates a particular degree of saturation.

9. An apparatus for carrying out a laser operation comprising a laser source connected to a lasing gas source via a lasing gas pipe system;
the laser source having one or more optical surfaces exposed to said lasing gas;
at least one lasing gas filter included in the lasing gas pipe system;
a base having inlet and outlet ports to said pipe system and being configured such that a quick-change filter is placeable on the base and removable therefrom by a simple operation;
the base being provided with a lasing gas supply port and a lasing gas discharge port both of which are adapted to couple to complementary elements of the quick-change filter and which ports automatically assume a position open to said pipe system in a condition of the quick-change filter placed on the base and which automatically assume a position closed to said pipe system in a condition of the quick-change filter removed from the base;
the base further having a bypass pipe containing no filtration element between the inlet and outlet ports of said base, which is in a closed position when a quick-change filter has been placed on the base and which is in an opened position connecting the ports when no quick-change filter has been placed on the base;
the closing of the lasing gas supply port and the lasing gas discharge port and the opening of the bypass pipe being effected mechanically and passively by the removal of the quick-change filter from the base and the opening of the lasing gas supply port and the lasing gas discharge port and the closing of the bypass pipe being effected mechanically and passively by the placement of a quick-change filter on the base,
the base comprising a first and second valve seat and a moveable element that is moveable between a first and second position within the base and is provided with first and second sealing elements, wherein when the quick-change filter is removed from the base, the moveable element is biased to move to the first position such that the first sealing element is pressed against the first valve seat to form a block in a fluid connection between the inlet port and the lasing gas supply port in the base while a fluid connection is opened between the inlet port and the by-pass pipe, and wherein the placement of a quick-change filter onto the base forces the moveable element to move to the second position so that the second sealing element is pressed against the second valve seat to form a block in a fluid connection between inlet port and the by-pass pipe while a fluid connection is opened between the inlet port and the lasing gas supply port in the base, wherein the first and second sealing elements do not form sealing contact with the base over at least a portion of the range of motion of the moveable element as the moveable element moves between the first position and the second position.

10. An apparatus according to claim 9, wherein a laser processing head is provided with the aid of which the laser beam is aimed at an object to be processed, wherein the laser processing head is connected to a processing gas source via a processing gas pipe system, wherein at least one processing gas filter is included in the processing gas pipe system.

11. An apparatus according to claim 10, wherein, in the processing gas pipe system, a base is included on which a quick-change filter is placeable and removable by a simple operation.

12. An apparatus according to claim 9 or 10, wherein the lasing gas pipe system and/or the processing gas pipe systems are provided with at least one moisture filter, an oxygen filter, a hydrocarbon filter and/or a particle filter.

13. An apparatus according to claim 12, wherein a series of at least two of the said filter types are included in the pipe system, among which the particle filter, wherein, of the series of filters, the particle filter is the filter included in the pipe system most downstream.

14. Use of a quick-change filter for cleaning lasing gas which is led to a laser source of a laser processing apparatus, wherein, by a simple operation, the quick-change filter is placeable on and removable from a base which is included in a lasing gas pipe system connecting a lasing gas source with the laser source, the base being provided with a gas supply port and a gas discharge port which automatically assume an opened position in a condition of the quick-change filter placed on the base and which automatically assume a closed position with a condition of the quick-change filter removed from the base, the base further having a bypass pipe containing no filtration element, which is in a closed position when a quick-change filter has been placed on the base and which is in an opened position when no quick-change filter has been placed on the base, the closing of the gas supply port and the gas discharge port and the opening of the bypass pipe being effected mechanically and passively by the removal of the quick-change filter from the base and the opening of the gas supply port and the gas discharge port and the closing of the bypass pipe being effected mechanically and passively by the placement of a quick-change filter on the base, the base comprising a first and second valve seat and a moveable element that is moveable between a first and a second position within the base and is provided with first and second sealing elements, wherein when the quick-change filter is removed from the base, the moveable element is biased to move to the first position such that the first sealing element is pressed against the first valve seat to form a block in a fluid connection between the lasing gas source and the gas supply port in the base while a fluid connection is opened between the lasing gas source and the by-pass pipe, and wherein the placement of a quick-change filter onto the base forces the moveable element to move to the second position so that the second sealing element is pressed against the second valve seat to form a block in a fluid connection between lasing gas source and the by-pass pipe while a fluid connection is opened between the lasing gas source and the gas supply port in the base, wherein the first and second sealing elements do not form sealing contact with the base over at least a portion of the range of motion of the movable element as the moveable element moves between the first position and the second position.

15. Use of a quick-change filter for cleaning a processing gas which is led to a laser processing head of a laser processing apparatus, wherein, by a simple operation, the quick-change filter is placeable on and removable from a base which is included in a processing gas pipe system connecting a processing gas source with the laser source, the base being provided with a gas supply port and a gas discharge port which automatically assume an opened position in a condition of the quick-change filter placed on the base and which automatically assume a closed position with a condition of the quick-change filter removed from the base, the base further having a bypass pipe containing no filtration element, which is in a closed position when a quick-change filter has been placed on the base and which is in an opened position when no quick-change filter has been placed on the base, the closing of the gas supply port and the gas discharge port and the opening of the bypass pipe being effected mechanically and passively by the removal of the quick-change filter from the base and the opening of the gas supply port and the gas discharge port and the closing of the bypass pipe being effected mechanically and passively by the placement of a quick-change filter on the base, the base comprising a first and second valve seat and a moveable element that is moveable between a first and a second position within the base and is provided with first and second sealing elements, wherein when the quick-change filter is removed from the base, the first sealing element is pressed against the first valve seat to form a block in a fluid connection between the processing gas source and the gas supply port in the base while a fluid connection is opened between the processing gas source and the by-pass pipe, and wherein the placement of a quick-change filter onto the base forces the moveable element to move to the second position so that the second sealing element is pressed against the second valve seat to form a block in a fluid connection between processing gas source and the by-pass pipe while a fluid connection is opened between the processing gas source and the gas supply port in the base, wherein the first and second sealing elements do not form sealing contact with the base over at least a portion of the range of motion of the moveable element as the moveable element moves between the first position and the second position.

16. A method according to claim 5, wherein, for the purpose of changing the processing gas quick-change filter, the quick-change filter is removed from the base, wherein, by the removal of the quick-change filter from the base, a gas supply and a gas discharge in the base to the quick-change filter are closed off automatically and a bypass pipe is automatically opened in the base, in such a manner that an uninterrupted gas supply to the laser processing head takes place, wherein, by placement of a new gas filter on the base, the bypass pipe is closed off automatically, the gas supply and gas discharge are opened automatically and the gas is fed through the filter.

17. A method according to claim 16, wherein the gas is led through a moisture filter, an oxygen filter, a hydrocarbon filter and/or a particle filter.

18. A method according to claim 17, wherein a series of at least two of the said filter types is included in the pipe system, among which the particle filter, wherein, of the series of filters, the particle filter is the filter included in the pipe system most downstream.

19. A method according to claim 6, wherein the at least one filter is provided with an indicator which indicates whether and optionally to what degree the filter material in the filter is saturated, wherein the filter is replaced by a new filter when the indicator indicates a particular degree of saturation.

20. A method according to claim 17, wherein the at least one filter is provided with an indicator which indicates whether and optionally to what degree the filter material in the filter is saturated, wherein the filter is replaced by a new filter when the indicator indicates a particular degree of saturation.

21. An apparatus according to claim 11, wherein, in the processing gas pipe system, the base is provided with a gas supply and a gas discharge which automatically assume an opened position in a condition of the quick-change filter placed on the base and which automatically assume a closed position with a condition of the quick-change filter removed from the base.

22. An apparatus according to claim 21, wherein, in the processing gas pipe system, the base is provided with a bypass pipe, which is in a closed position when a quick-change filter has been placed on the base and which is in an opened position when no quick-change filter has been placed on the base.

* * * * *

UNITED STATES PATENT AND TRADEMARK OFFICE
CERTIFICATE OF CORRECTION

PATENT NO.         : 7,873,093 B2                           Page 1 of 1
APPLICATION NO.    : 11/257764
DATED              : January 18, 2011
INVENTOR(S)        : Marinus Frans van der Maas It is certified that error appears in the above-identified patent and that said Letters Patent is hereby corrected as shown below:

IN THE SPECIFICATIONS:

Column 1, line 52, "easing" should read -- lasing --; and

Column 3, line 26, "abase" should read -- a base --.

Signed and Sealed this
Fifteenth Day of May, 2012

David J. Kappos
*Director of the United States Patent and Trademark Office*